US012693641B2

(12) United States Patent
    Goodman et al.

(10) Patent No.:    US 12,693,641 B2
(45) Date of Patent:         Jul. 28, 2026

(54) SYSTEMS, APPARATUSES, METHODS, AND COMPUTER PROGRAM PRODUCTS FOR CORRECTING PROCESS SIMULATION PREDICTIONS AS A FUNCTION OF OPERATING CONDITIONS

(71) Applicant: Honeywell International Inc., Charlotte, NC (US)

(72) Inventors: John Goodman, Katy, TX (US); Abhishek Pednekar, West Hills, CA (US); Mahboubeh Hejazibakhsh, Atlanta, GA (US)

(73) Assignee: Honeywell International Inc., Charlotte, NC (US)

( * ) Notice:   Subject to any disclaimer, the term of this patent is extended or adjusted under 35 U.S.C. 154(b) by 518 days.

(21) Appl. No.: 18/304,040

(22) Filed:   Apr. 20, 2023

(65)          Prior Publication Data

US 2024/0353806 A1      Oct. 24, 2024

(51) Int. Cl.
     G05B 13/04        (2006.01)
     G05B 13/02        (2006.01)
(52) U.S. Cl.
     CPC ......... G05B 13/048 (2013.01); G05B 13/027 (2013.01)
(58) Field of Classification Search
     CPC ..... G05B 13/048; G05B 13/027; G05B 17/02
     See application file for complete search history.

(56)          References Cited

U.S. PATENT DOCUMENTS

2006/0259197 A1*  11/2006  Boe ..................... G05B 13/042
                                                    700/44
2007/0168057 A1*   7/2007  Blevins ............... G05B 13/048
                                                    700/53
2009/0222108 A1*   9/2009  Lou ........................ G05B 13/04
                                                    700/32
2012/0173004 A1*   7/2012  Radl ................... G05B 13/048
                                                    700/29
2020/0379442 A1*  12/2020  Chan ................... B01J 19/0033

* cited by examiner

*Primary Examiner* — Christopher E. Everett
(74) *Attorney, Agent, or Firm* — Alston & Bird LLP

(57)          ABSTRACT

Embodiments of the disclosure provide for generating optimal model prediction for process simulation. Some embodiments receive input dataset associated with the operation of an industrial plant, generates one or more predictions based on the input dataset and using a hybrid process simulation model. The one or more predictions may include FP model-predicted data indicative of predicted value for each of one or more process variables and error prediction indicative of a discrepancy between the FP model-predicted data and ground-truth data for the one or more process variables. Optimal model-predicted data may be generated based on the FP model-predicted data and the error prediction the optimal model-predicted data may be indicative of optimal process simulation output. Performance of one or more prediction-based actions may be initiated based on the optimal model-predicted data.

20 Claims, 6 Drawing Sheets

600

RECEIVE INPUT DATASET ASSOCIATED WITH
THE OPERATION OF AN INDUSTRIAL PLANT
602

GENERATE ONE OR MORE PREDICTIONS 604

GENERATE OPTIMAL MODEL-PREDICTED
DATA 606

INITIATE THE PERFORMANCE OF ONE OR MORE
PREDICTION-BASED ACTIONS 608

SYSTEMS, APPARATUSES, METHODS, AND COMPUTER PROGRAM PRODUCTS FOR CORRECTING PROCESS SIMULATION PREDICTIONS AS A FUNCTION OF OPERATING CONDITIONS

TECHNOLOGICAL FIELD

Embodiments of the present disclosure generally relate to process simulation, and specifically to correcting process simulation predictions as a function of operating conditions.

BACKGROUND

Various embodiments of the present disclosure address technical challenges related to process simulation. Through applied effort, ingenuity, and innovation, Applicant has solved problems related to process system by developing solutions embodied in the present disclosure, which are described in detail below

BRIEF SUMMARY

In general, embodiments of the present disclosure herein provide for generating optimal model prediction for process simulation. Other implementations for generating optimal model prediction for process simulation will be, or will become, apparent to one with skill in the art upon examination of the following figures and detailed description. It is intended that all such additional implementations be included within this description, be within the scope of the disclosure, and be protected by the following claims.

In accordance with one aspect of the present disclosure, a computer-implemented method for generating optimal model prediction for process simulation is provided. The computer-implemented method is executable utilizing any of a myriad of computing device(s) and/or combinations of hardware, software, and/or firmware. In some example embodiments, an example computer-implemented method includes receiving input dataset associated with the operation of an industrial plant; generating, based on the input dataset and using a hybrid process simulation model, one or more predictions, wherein the one or more predictions comprise FP model-predicted data indicative of predicted value for each of one or more process variables and error prediction indicative of a discrepancy between the FP model-predicted data and ground-truth data for the one or more process variables; generating, based on the FP model-predicted data and the error prediction, optimal model-predicted data indicative of optimal process simulation output; and initiating, based on the optimal model-predicted data, the performance of one or more prediction-based actions.

In some example embodiments, the hybrid process simulation model comprise a first principles model configured to generate the FP model-predicted data, and a data-driven model configured to generate the error prediction.

In some example embodiments, the data-driven model comprises a neural network model.

In some example embodiments, the data-driven model comprises a regression model.

In some example embodiments, the data-driven model is previously trained using one or more supervised training techniques.

In some example embodiments, the data-driven model is trained on training dataset that includes one or more of historical input dataset, historical FP model-predicted data corresponding to the historical input dataset, or ground-truth data corresponding to the historical input dataset.

In some example embodiments, the example computer-implemented method further includes training the data-driven model, wherein training the data-driven model comprises executing a plurality of simulation scenarios, and each simulation scenario is associated with a set of one or more operating conditions of a plurality of sets of one or more operating conditions.

In some example embodiments, generating the optimal model-predicted data comprises applying the error prediction to the FP model-predicted data.

In some example embodiments, the hybrid process simulation model is configured for simulation at different operating conditions.

In some example embodiments, the hybrid process simulation model is configured for online simulation and offline simulation.

In some example embodiments, the input dataset is provided as input to the first principles model and the data-driven model.

In some example embodiments, the example computer-implemented method further includes generating the hybrid process simulation model.

in some example embodiments, the one or more prediction-based actions comprise automatic reconfiguring of one or more process variables associated with operation of the industrial plant based on the optimal model-predicted data.

In accordance with another aspect of the present disclosure, an apparatus for generating optimal model prediction for process simulation is provided. The apparatus in some embodiments includes at least one processor and at least one non-transitory memory, the at least one non-transitory memory having computer-coded instructions stored thereon. The computer-coded instructions in execution with the at least one processor causes the apparatus to perform any of the example computer-implemented methods described herein. In some other embodiments, the apparatus includes means for performing each step of any of the computer-implemented methods described herein.

In accordance with another aspect of the present disclosure, a computer program product for generating optimal model prediction for process simulation is provided. The computer program product in some embodiments includes at least one non-transitory computer-readable storage medium having computer program code stored thereon. The computer program code in execution with at least one processor is configured for performing any one or the example computer-implemented methods described herein.

BRIEF DESCRIPTION OF THE SEVERAL VIEWS OF THE DRAWINGS

Figure 1:
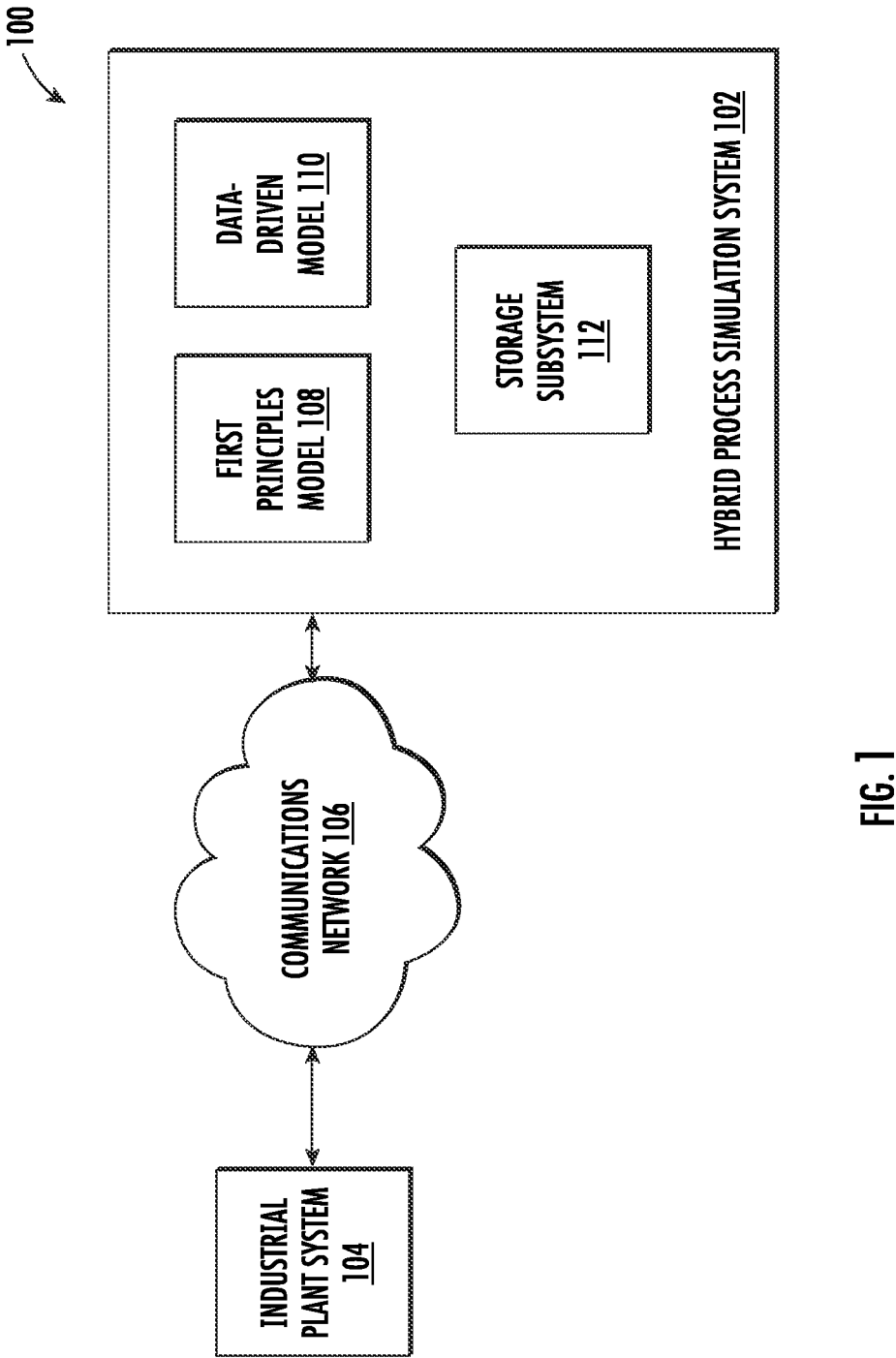
Figure 2:
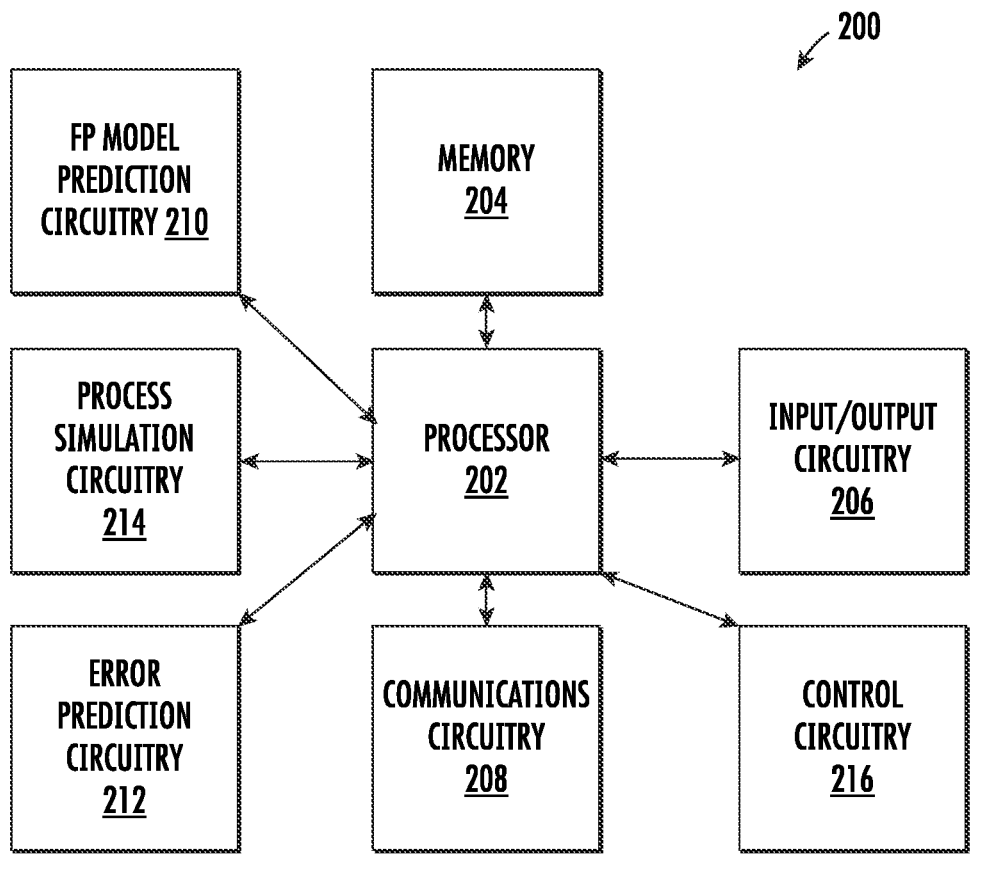
Figure 3A:
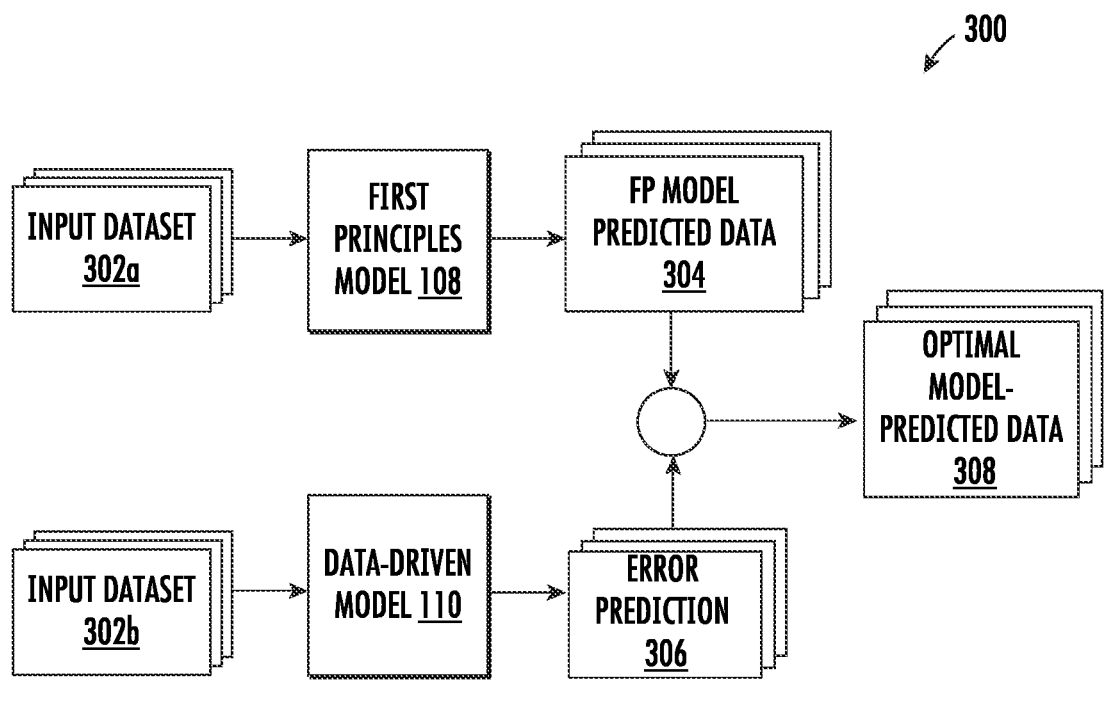
Figure 3B:
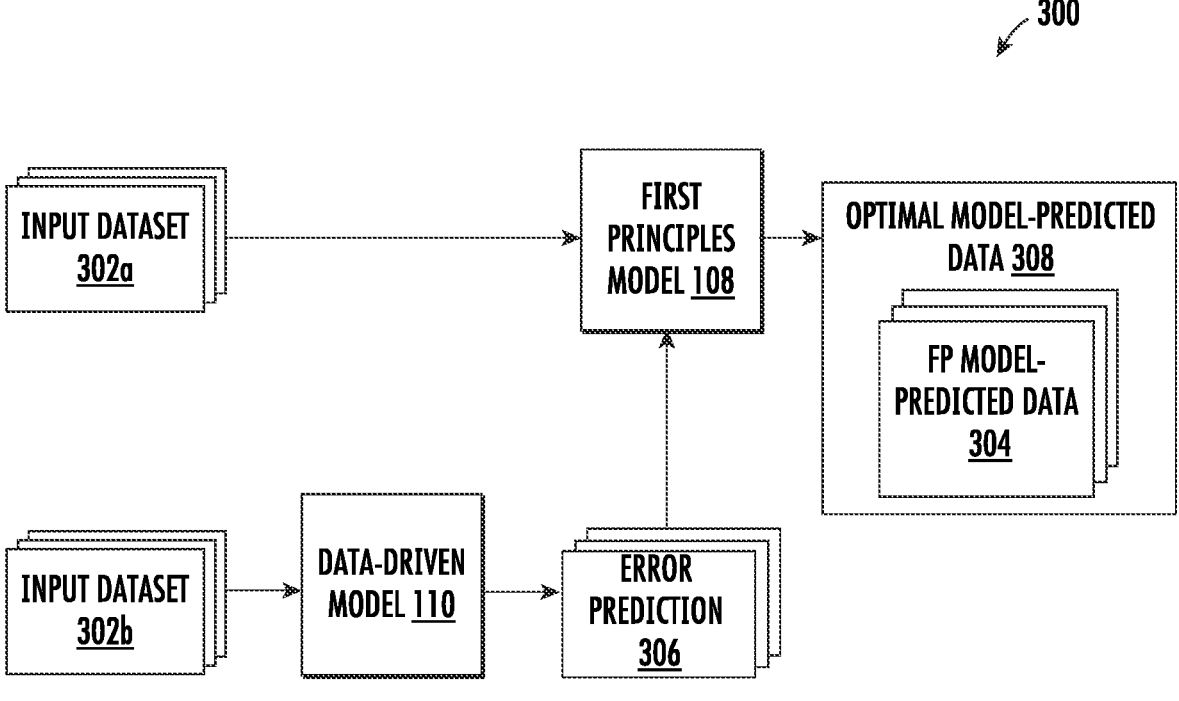
Figure 4:
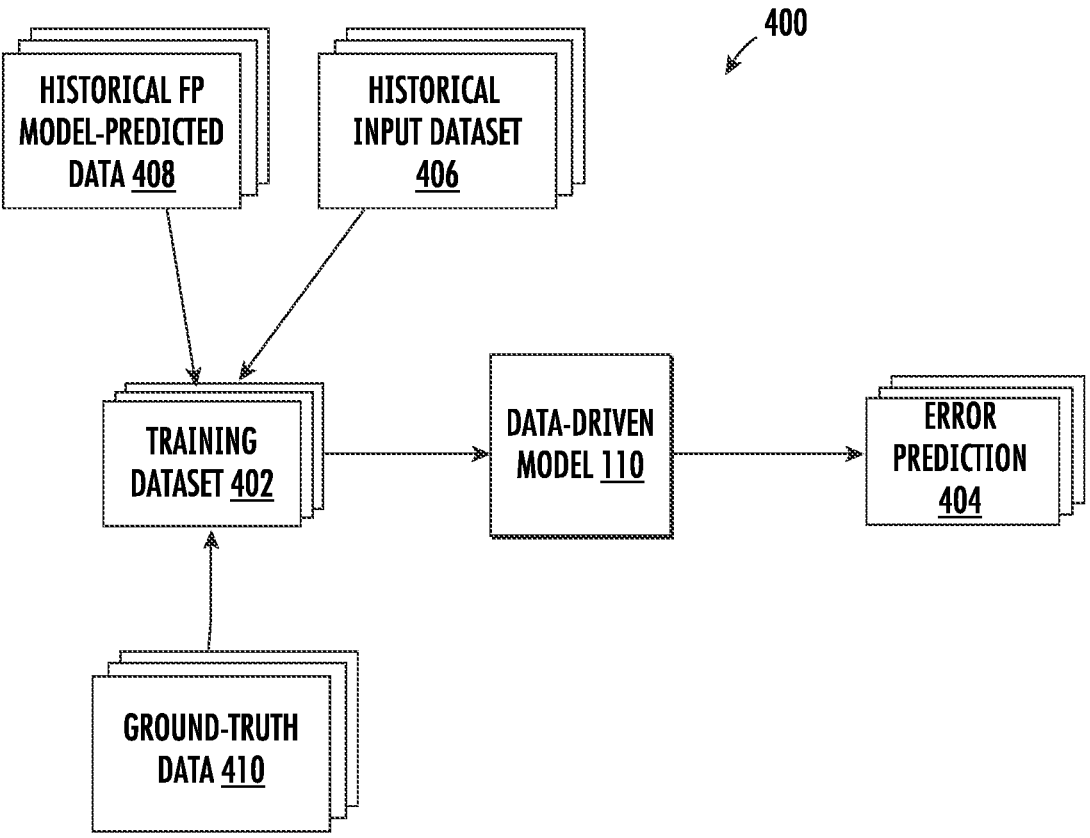
Figure 5:
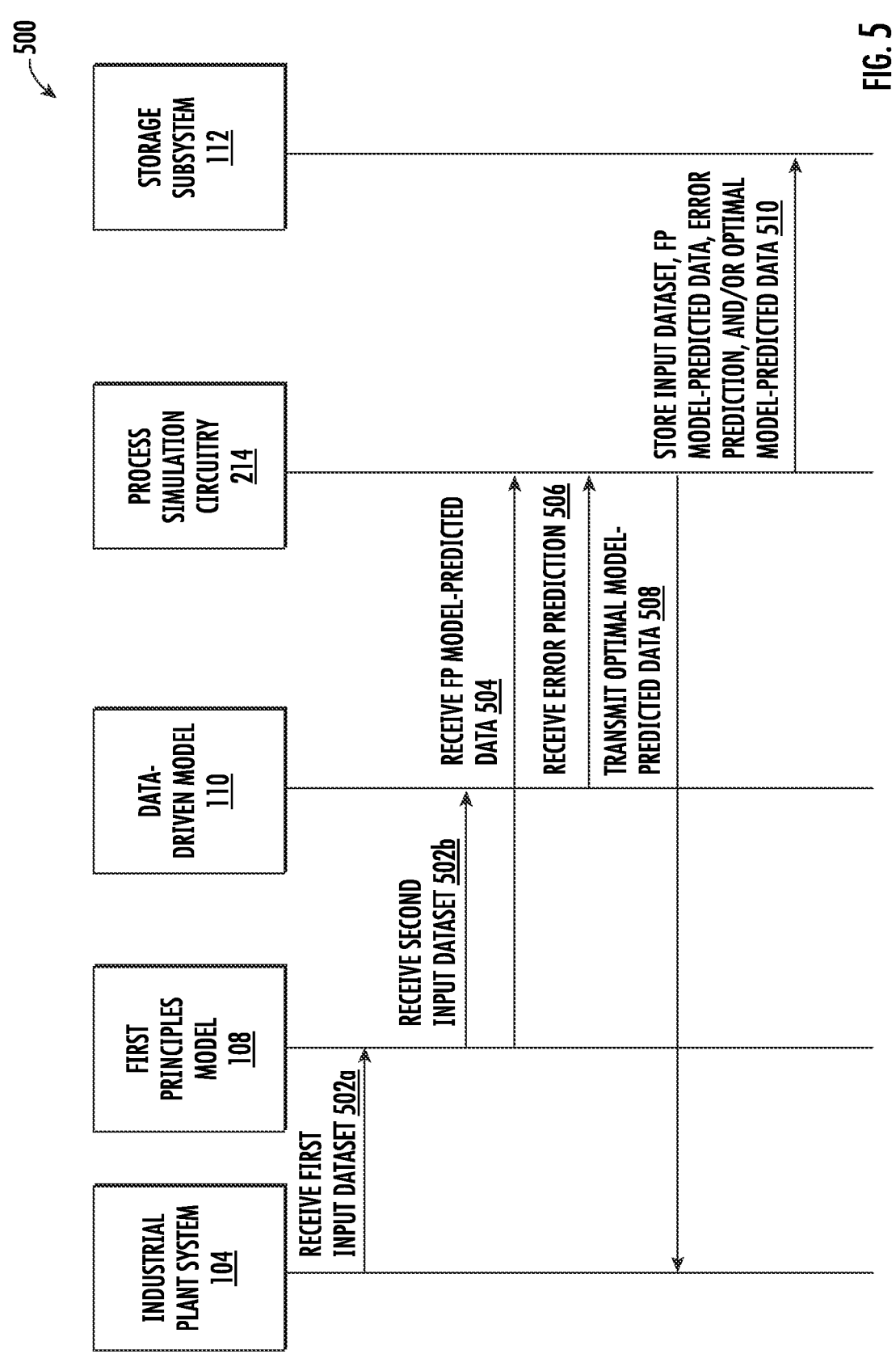
Figure 6:
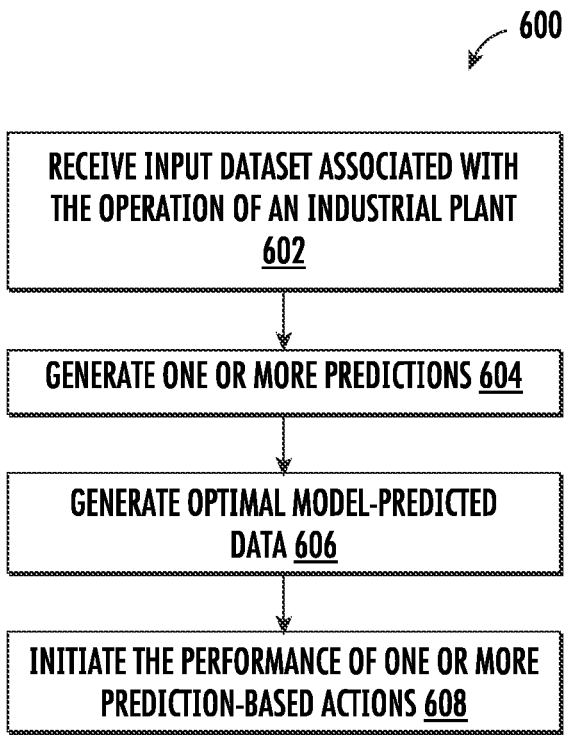

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2 illustrates a block diagram of an example apparatus that may be specially configured in accordance with an example embodiment of the present disclosure;

FIG. 3a illustrates a visualization of an example data environment for correcting process model predictions in accordance with an example embodiment of the present disclosure;

FIG. 3*b* illustrates a visualization of an example data environment for correcting process model predictions in accordance with an example embodiment of the present disclosure;

FIG. 4 illustrates a visualization of an example data environment for training a data-driven model in accordance with an example embodiment of the present disclosure;

FIG. 5 illustrates a signal diagram of a model prediction correction scheme using a hybrid process simulation model in accordance with an example embodiment of the present disclosure; and FIG. 6 illustrates a flowchart showing an example of a process for model prediction correction using a hybrid process simulation model in accordance with an example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the present disclosure may be embodied in many different forms and should not be construed as limited to the embodiments set forth herein, rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based on in part on," "based at least on," "based upon," and/or similar words are used herein interchangeably in an open-ended manner such that they do not indicate being based only on or based solely on the referenced element or elements unless so indicated. Like numbers refer to like elements throughout.

Overview and Technical Improvements

Various embodiments of the present disclosure address technical challenges related to process simulation models. Process simulation models may be configured for modelling and/or simulating processes associated with, for example, an industrial plant (e.g., gas processing plants, oil refineries, and/or the like). Such modelling and simulating may be used monitor, control, and/or optimize equipment and/or processes of an industrial plant. However, process simulation models are inherently imperfect and may be associated with model inaccuracies. A model inaccuracy, for example, may manifest as a gain and/or bias between the model prediction and actual plant measurements. Conventional simulation systems rely on a fixed gain and/or bias to estimate model inaccuracies. The inventors have identified deficiencies in conventional simulation systems that rely on fixed gain and/or bias to estimate model inaccuracies. As a non-limiting example, the inventors have determined that using fixed gain and/or bias to correct model predictions does not account for non-linearity in the simulated process. As process conditions for a process changes, the process may exhibit non-linear behavior that is not reflected in a fixed gain and/or bias. Accordingly, a need exists for systems, apparatuses, methods, and computer program products for correcting model predictions as a function of operating conditions.

Various embodiments of the present disclosure provide for correcting model predictions as a function of operating conditions. Various embodiments of the present disclosure utilize a hybrid model to correct first principles model predictions as a function of operating conditions by leveraging a data-driven model to generate error predictions for the first principles model. Various embodiments, apply the error predictions (e.g., inferred difference between the first principles model and plant measurement) to the first principles model to generate optimal model-predicted data.

Accordingly, by leveraging a hybrid process simulation model to correct first principles model predictions as a function of operating conditions, various embodiments of the present disclosure enable numerous capability that otherwise would not be available or at least be suboptimal. As one example, by leveraging a hybrid process simulation model to correct first principles model predictions as a function of operating conditions, various embodiments of the present disclosure enable offline simulation studies (e.g., "what if" studies), optimization under different operating conditions, to name a few.

Moreover, by leveraging a hybrid process simulation model to correct first principles model predictions as a function of operating conditions, various embodiments of the present disclosure improve model prediction accuracy, which obviates the need for a user to perform multiple additional simulations and, in turn, improves computing efficiency as well as end-user efficiency. Accordingly, various embodiments of the present disclosure improves process simulation technology.

Definitions

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The term "industrial plant," "plant," and/or similar terms used herein interchangeably may refer to one or more buildings, complex, or arrangement of components that perform a chemical, physical, electrical, mechanical process, and/or the like for converting input materials into one or more output products. Non-limiting examples of an industrial plant include a chemical industrial plant, automotive manufacturing plant, distillery, oil refinery, fabric manufacturing plant, and/or the like.

The term "physical component" with respect to an industrial plant may refer to asset(s) within or associated with the industrial plant. Such assets, for example, may include real-world equipment, system, or other physical structure within and/or associated with the industrial plant, and that is utilized by the industrial plant. For example, a physical component with respect to an industrial plant may comprise equipment, system, or other structure that is utilized in a process performed by the industrial plant. In an example context of an oil refinery plant, non-limiting examples of a physical component may include a furnace, a pump, a heat exchanger, and/or the like.

The term "process simulation model" may refer to a model-based representation of one or more processes of an industrial plant. A process simulation model may be configured to facilitate designing, developing, analyzing, monitoring, controlling, optimizing, and/or the like one or more processes of the industrial plant. Such processes for example, may include chemical processes, biological processes, and/or the like. In one or more embodiments, a process simulation model embodies a flowsheet that describes the process flow through an industrial plant. A non-limiting example of a process simulation model is a first principles model.

The term "hybrid process simulation model" may refer to a model-based representation of one or more processes of an industrial plant. The hybrid process simulation model may include one or more models configured, trained, and/or the like to collectively generate optimal model-predicted data for the one more processes of the industrial plant. In some examples, the hybrid process simulation model may include multiple models configured to perform one or more different stages of a prediction process. By way of example, the hybrid process simulation model may include a first and second model. The first model may include a first principles model that is configured to generate a first prediction for a process. The second model may include a data-driven model that is trained to generate a second prediction. In some examples, the second prediction may be applied to the first prediction to generate a final prediction.

The term "first principles model" may refer to a model-based representation of one or more processes of an industrial plant based on fundamental laws of physics, thermodynamics, kinetics, chemistry, etc. For example, a feed stream associated with a gas refrigeration plant may be defined in a first principles model in terms of its physical and/or chemical properties. As another example, a feed stream associated with a crude oil processing plant may be defined in a first principles model in terms of its physical and/or chemical properties. One or more inputs to a first principles model may be fixed input(s), while one or more inputs to the process simulation model may be variable input(s). Additionally or alternatively, one or more inputs to a first principles model may be a computed value, for example, by the first principles model and/or by a predictive model such as a machine learning model or artificial intelligent model. Additionally or alternatively, one or more inputs to the first principles model may comprise data received from the industrial plant whose process(es) is modeled by the first principles model. As a non-limiting example, such data received from the plant may comprise process variable measurements (e.g., sensor-based measurements). In some embodiments, process variable measurements may include equipment variable measurements (e.g., equipment variable measurements associated with a process).

In some examples, a first principles model may be configured for online simulation and/or offline simulation. In one or more embodiments, execution of a first principles model includes performing one or more operations. As a non-limiting example, the one or more operations may include an optimization operation with respect to one or more objective functions (e.g., minimum energy, maximum production, maximum profit, minimum cost, and/or the like) in order to determine optimal operating points/conditions for specified process variables, such as key performance indicators associated with operation of the corresponding industrial plant. An optimal operating point/condition for a specified parameter, for example, may describe a stable operating point/condition for the specified parameter. In some embodiments, a first principles model may include a steady-state model or a dynamic model. For example, in some embodiments a first principles model may simulate a steady state process and/or a dynamic process. In some embodiments, a first principles model may be associated with or otherwise embodied by a digital twin model.

The term "model-predicted data, FP model-predicted data" and or similar terms used herein interchangeably may refer to a data entity that describes output of a process simulation model, such a first principles model. FP model-predicted data may include measurements for one or more process variables. In some examples, the one or more process variables may represent key performance indicators for an industrial plant whose process(es) is modeled and/or simulated by the process simulation model.

The term "data-driven model" may refer to a data entity that describes a model that is generated based on empirical data. In some example, the empirical data may be obtained from historical data, simulations, experiments, a combination thereof, and/or the like. A data-driven model may be configured to extract and/or determine correlations and/or patterns in input data to generate corresponding output. In some embodiments, a data-driven model may include a machine learning model. In some embodiments a data-driven model 110 is configured, trained, and/or the like to generate an error prediction for a first principles model. In some examples, the data-driven model 110 may include one or more of any type of machine learning model including one or more supervised, unsupervised, semi-supervised, reinforcement learning models, and/or the like. In some examples, the data-driven model may include multiple models configured to perform one or more different stages of a prediction process. In some embodiments, the data-driven model includes a neural network, such as a recurrent neural network, deep neural network, and/or the like. In some examples, the data-driven model may include one or more neural networks that are previously trained, using one or more supervised and/or unsupervised machine learning techniques, to generate an error prediction for a first principles model. In some embodiments, the data-driven model 110 includes a regression model, such as a linear regression model, a partial least square regression model, a support vector regression model, and/or the like. In some examples, the data-driven model may include one or more regression models that are previously trained, using one or more supervised and/or unsupervised machine learning techniques, to generate an error prediction for a first principles model.

The term "error prediction" may refer to a data entity that describes a measure of error, inaccuracy, and/or similar terms as user herein interchangeably of associated with a model prediction, such as model prediction of a first principles model. An error prediction may be indicative of the difference between a model prediction and corresponding ground-truth data (e.g., actual plant measurements).

The term "optimal model-predicted data" may refer to a data entity that describes output of a hybrid process simulation model. Optimal model-predicted data may include predicted values for one or more process variables. In some examples, the one or more process variables may represent key performance indicators for an industrial plant whose process(es) is modeled and/or simulated by the process simulation model. In some examples, optimal model-predicted data reflects a model prediction correction scheme configured to correct model predictions as a function of operating conditions.

The term "digital twin model" may refer to a digital, model-based representation of physical components (e.g., equipment, system, processes, etc.) in operation. In one or more embodiments, a digital twin model is configured to run with plant data in that incoming data (e.g., operational data) from the plant is fed into the digital twin model to update the model. As such, a digital twin model may describe a representation of equipment and/or processes of an industrial plant that reflects the current operating conditions. A digital twin model may be used to monitor, refine, control, predict, and/or optimize operations of the industrial plant. In some embodiments, a digital twin model include at least a first principles model.

Example Systems and Apparatuses

FIG. 1 illustrates a block diagram of an environment/ system 100 in which embodiments of the present disclosure may operate. Specifically, FIG. 1 illustrates an industrial plant system 104 system in communication with a hybrid process simulation system 102. In some embodiments, the industrial plant System 104 communicates with the hybrid process simulation system 102 over one or more communication network(s), for example a communications network 106. In some embodiments, the industrial plant system 104 is in communication with a plurality of industrial plant systems, each identically or similarly configured to the industrial plant system 104. In some such embodiments, the hybrid process simulation system 102 may process data associated with each industrial plant system 104 independently, and/or in some contexts processes data associated with multiple industrial plant systems 104 in the aggregate (e.g., when processing all industrial plant system 104 associated with a particular entity, region, and/or the like).

It should be appreciated that the communications network 106 in some embodiments is embodied in any of a myriad of network configurations. In some embodiments, the communications network 106 embodies a public network (e.g., the Internet). In some embodiments, the communications network 106 embodies a private network (e.g., an internal localized, or closed-off network between particular devices). In some other embodiments, the communications network 106 embodies a hybrid network (e.g., a network enabling internal communications between particular connected devices and external communications with other devices). The communications network 106 in some embodiments includes one or more base station(s), relay(s), router(s), switch(es), cell tower(s), communications cable(s) and/or associated routing station(s), and/or the like. In some embodiments, the communications network 106 includes one or more user controlled computing device(s) (e.g., a user owned router and/or modem) and/or one or more external utility devices (e.g., Internet service provider communication tower(s) and/or other device(s)).

Each of the components of the system 100 communicatively coupled to transmit data to and/or receive data from one another over the same or different wireless and/or wired networks embodying the communications network 106. Such configuration(s) include, without limitation, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities communicating over the communications network 106, the various embodiments are not limited to this architecture. In other embodiments, one or more computing entities share one or more components, hardware, and/or the like, or otherwise are embodied by a single computing device such that connection(s) between the computing entities are over the communications network 106 are altered and/or rendered unnecessary. For example, in some embodiments, the industrial plant system 104 includes some or all of the hybrid process simulation system 102, such that an external communications network 106 is not required.

In some embodiments, the industrial plant system 104 and the hybrid process simulation system 102 are embodied in an on-premises system within or associated with an industrial plant. In some such embodiments, the industrial plant system 104 and the hybrid process simulation system 102 are communicatively coupled via at least one wired connection. Alternatively or additionally, in some embodiments, the industrial plant system 104 embodies or includes the hybrid process simulation system 102, for example as a software component of a single enterprise terminal.

In some embodiments, the industrial plant system 104 includes any number of computing device(s), system(s), physical component(s), and/or the like, that facilitates producing of any number of products, for example utilizing particular configurations that cause processing of particular inputs available within the industrial plant system 104. In some embodiments, the industrial plant system 104 includes one or more physical component(s), connection(s) between physical component(s), and/or computing system(s) that control operation of each physical component therein. In some embodiments, a physical component includes asset(s) within or associated with an industrial plant associated with the industrial plant system 104. Such assets, for example, may include equipment, process, system, and/or the like within and/or associated with the industrial plant, and that is utilized by the industrial plant. For example, a physical component with respect to an industrial plant may comprise equipment, system, or other structure that is utilized in a process performed by the industrial plant. In an example context of an oil refinery plant, non-limiting examples of a physical component may include a furnace, a pump, a heat exchanger, and/or the like. The industrial plant system 104, for example, may embody or otherwise be associated with an industrial plant such as an oil refinery, an automotive engine manufacturing plant, a distillery, and/or the like, which includes physical component(s) that perform particular process(es) to alter properties of inputs to the component (s). Additionally or alternatively, in some embodiments the industrial plant system 104 includes one or more computing system(s) that are specially configured to operate the physical component(s) in a manner that produces one or more particular product(s), for example, simultaneously.

In some embodiments, an industrial plant system 104 includes one or more computing device(s) and/or system(s)

embodied in hardware, software, firmware, and/or a combination thereof, that configure and/or otherwise control operation of one or more physical component(s) in the corresponding industrial plant(s). For example, in some embodiments, such computing device(s) and/or system(s) include one or more programmable logic controller(s), MPC(s), application server(s), centralized control system(s), and/or the like, that control(s) configuration and/or operation of at least one physical component. It will be appreciated that different industrial plant system(s) may include or otherwise be associated with different physical component(s), computing system(s), and/or the like.

In some embodiments, the hybrid process simulation system 102 includes one or more application server(s) and/or database server(s) that provide such functionality. Additionally or alternatively, in some embodiments, the hybrid process simulation system 102 includes one or more client device(s), user device(s), and/or the like, that enable access to the functionality provided via the hybrid process simulation system 102, for example via a web application, a native application, and/or the like executed on the client device. In some embodiments, the hybrid process simulation system 102 includes or embodies a display or other user interface to which a user-facing interface is renderable.

In some embodiments, the hybrid process simulation system 102 includes one or more computing device(s) and/or system(s) embodied in hardware, software, firmware, and/or a combination thereof, that can model and/or simulate process(es) associated with an industrial plant, such as an industrial plant associated with industrial plant system 104. In some embodiments, the hybrid process simulation system 102 includes one or more specially configured application server(s), database server(s), end user device(s), cloud computing system(s), and/or the like. Additionally or alternatively, in some embodiments, the hybrid process simulation system 102 includes one or more user device(s) that enables access to functionality provided by the hybrid process simulation system 102, for example via a web application, native application, and/or the like. For example, in some embodiments, the hybrid process simulation system 102 provides cloud-based functionality to an end-user that facilitates cloud-based monitoring, controlling, optimization, etc., of physical component(s) (e.g., equipment, process(es), and/or the like) associated with an industrial plant embodied by the industrial plant system 104.

In some embodiments, the hybrid process simulation system 102 includes a storage subsystem 112. In some embodiments, the storage subsystem 112 is internal to the hybrid process simulation system 102. In some embodiments, the storage subsystem 112 is external to the hybrid process simulation system 102. For example, in some embodiments, the storage subsystem 112 may comprise a part of a separate system in communication with the hybrid process simulation system 102 (e.g., via the communications network 106).

In some embodiments, the hybrid process simulation system 102 is configured to output optimal model-predicted data. In some embodiments, the hybrid process simulation system 102, is configured to perform, based at least in part on input dataset associated with the industrial plant, one or more modeling operations and/or simulation operations to generate the optimal model-predicted data. In some embodiments, the optimal model-predicted data includes data that represents or otherwise is indicative of predicted values (e.g., measurements) for one or more process variables associated with operation of the industrial plant. Additionally or alternatively, in some embodiments, the optimal model-predicted data includes data indicative of operating points/condition(s) for one or more process variables. In some embodiments, the one or more process variables may include equipment variable(s) (e.g., equipment variable measurements associated with a process). Additionally or alternatively, in some embodiments, optimal model-predicted data includes data that represents or is otherwise indicative of predicted optimal operating points/conditions for one or more process variables associated with a process of the industrial plant. Additionally or alternatively, in some embodiments, the optimal model-predicted data includes data that represents or is otherwise indicative of one or more of predicted plant performance measure. Additionally or alternatively, in some embodiments, the optimal model-predicted data includes data that represents or is otherwise indicative of comparison results of current plant performance against historical plant performance. In some embodiments, comparison results may facilitate detection of changes associated with operation of the industrial plant, such as changes in process(es) of the industrial plant.

In some embodiments, the hybrid process simulation system 102 and/or the optimal model-predicted data output thereof may be leveraged for designing, analyzing, monitoring, controlling, and/or optimizing various operations of an industrial plant associated with the industrial plant system 104. As a non-limiting example, the hybrid process simulation system 102 may be used for optimization based on one or more optimization objective functions and/or constraints in order to determine optimal operating points/conditions for process variables. In some examples, non-limiting examples of such optimization object functions may include minimum energy objective function, maximum production objective function, maximum profit objective function, minimum cost objective function, and/or the like. In some examples, non-limiting examples of constraints with respect to an optimization operation include physical equipment limits constraint, safe operating limits constraints, product quality specifications constraints, product flows (minimum or maximum limits) constraints, energy use constraints, feed availability constraints, and/or the like. In some embodiments, an optimal operating point/condition for a specified variable describes a stable operating point/condition for the specified parameter.

In some embodiments, the hybrid process simulation system 102 and the industrial plant system 104 communicate with one another to perform the various actions described herein. For example, in some embodiments, the hybrid process simulation system 102 and the industrial plant system 104 communicate in order to generate optimal model-predicted data associated with operation of an industrial plant embodied by the industrial plant system 104. Additionally or alternatively, in some embodiments, the hybrid process simulation system 102 and the industrial plant system 104 communicate to facilitate control or adjustment of operation of physical component(s) within or associated with the industrial plant based at least in part on the generated optimal model-predicted data. For example, in some embodiments, the hybrid process simulation system 102 and the industrial plant system 104 can communicate to automatically configure or reconfigure one or more physical component(s) of the industrial plant based on the optimal model-predicted data.

In some embodiments, the hybrid process simulation system 102 is configured to generate and output optimal model-predicted data. In some embodiments, optimal model-predicted data includes data that represents or otherwise is indicative of predicted measurement(s) for one or more process variables associated with operation of an industrial plant embodied by the industrial plant system 104. Additionally or alternatively, in some embodiments, optimal model-predicted data includes data indicative of operating points/condition(s) for one or more process variables. Additionally or alternatively, in some embodiments, optimal model-predicted data includes data that represents or is otherwise indicative of predicted optimal operating points/conditions for one or more process variables associated with a process of an industrial plant embodied by the industrial plant system 104. Additionally or alternatively, in some embodiments, the optimal model-predicted data includes data that represents of is otherwise indicative of one or more of predicted plant performance measure. Additionally or alternative, in some embodiments, the optimal model-predicted data include data that represents or is otherwise indicative of comparison results of current plant performance against historical plant performance. In some embodiments, comparison results may facilitate detection of changes associated with operation of the industrial plant, such as changes in process(es) of the industrial plant.

In some embodiments, the hybrid process simulation system 102 is configured to correct one or more model prediction errors associated with the hybrid process simulation system 102. In some embodiments, the hybrid process simulation system 102 is configured to correct the one or more model prediction errors as a function of operating conditions. For example, in some embodiments, the hybrid process simulation system 102 is configured to output optimal model-predicted data that reflects corrected model prediction based on operating conditions. To generate optimal model-predicted data the hybrid process simulation system 102 may leverage a model prediction correction scheme that is configured to correct model predictions errors as a function of operating conditions. The hybrid process simulation system 102 may be configured to consider nonlinearity in the respective process when correcting for model prediction errors. For example, one or more process(es) of an industrial plant may exhibit non-linear behavior in response to exposure to different operating conditions. The hybrid process simulation system 102 may leverage a model prediction correction scheme that accounts for the noted non-linear behavior.

In some embodiments, the model prediction correction scheme includes leveraging predictions of the two models. For example, in some embodiments, to correct model prediction errors as a function of operation conditions, the hybrid process simulation system 102 leverages predictions of two models. In some embodiments, the hybrid process simulation system 102 includes a first principles model 108 configured to generate a first prediction, and a data-driven model 110 configured to generate a second prediction. In some embodiments, the hybrid process simulation system 102 may include a plurality of first principles model 108 and/or a plurality of data-driven model 110.

In some embodiments, the first principles model 108 is configured to facilitate various functionalities associated with the hybrid process simulation system 102. In some embodiments, a first principles model is a model-based representation of one or more assets (e.g., equipment and/or processes and/or their units) of an industrial plant based on fundamental laws of physics, thermodynamics, kinetics, chemistry, and/or the like. A first principles model may be generated based on underlying physics, thermodynamic, kinetics, chemistry, etc., of equipment and/or process(es) modeled by the first principles model. In some embodiments, the first principles model 108 is configured to model one or more processes and/or equipment of an industrial plant associated with the industrial plant system 104. In some embodiments, a first principles model 108 may include a steady-state model or a dynamic model in that the first principles model 108 may be a steady state representation or dynamic representation of process(es) of an industrial plant.

In one or more embodiments, the first principles model 108 and/or the hybrid process simulation system 102 embodies a flowsheet that represents the process flow through the industrial plant. In some embodiments, a flowsheet can define asset models and their associated properties utilized by the hybrid process simulation system 102 (e.g., the first principles model 108 thereof) to perform process simulation. In some embodiments, a flowsheet is configured to model relationships between processes and/or equipment of the plant. A flowsheet model, for example, may relate individual equipment (e.g., pumps, heat exchangers, distillation unit, etc.) to performance variables (e.g., key performance indicators) of overall plant process. In some embodiments, the first principles model 108 is configured perform one or more of its calculations (e.g., implement one or more algorithms) within the flowsheet.

In some embodiments, the first principles model 108 is configured to implement one or more specially configured algorithms based on inter-related asset models for an industrial plant associated with the industrial plant system 104. In some embodiments, the first principles model 108 is configured to implement the one or more specially configured algorithms to model and/or simulate assets of the plant. Additionally or alternatively, the first principles model 108 may be configured to implement the one or more specially configured algorithms to generate one or more predictions.

In some embodiments, the first principles model 108 is configured to generate FP model-predicted data 304 for the industrial plant based on the process model for the industrial plant. In some embodiments, FP model-predicted data 304 includes predicted values for one or more process variables associated with operation of the industrial plant. In some examples, the one or more process variables may represent key performance indicators for the industrial plant. In some embodiments, the FP model-predicted data includes data that represents or is otherwise indicative of predicted values for one or more process variables associated with operation of an industrial plant. Additionally or alternatively, in some embodiments, the FP model-predicted data includes data indicative of operating points/condition(s) for one or more process variables. Additionally or alternatively, in some embodiments, FP model-predicted data includes data that represents or is otherwise indicative of predicted optimal operating points/conditions for one or more process variables. Additionally or alternatively, in some embodiments, the FP model-predicted data includes data that represents of is otherwise indicative of one or more of predicted plant performance measure. Additionally or alternative, in some embodiments, the FP model-predicted data includes data that represents or is otherwise indicative of comparison results of current plant performance against historical plant performance.

In some embodiments, one or more inputs for the first principles model 108 may be fixed input(s), while one or more inputs for the first principles model 108 may be variable input(s). Additionally or alternatively, one or more inputs for the first principles model 108 may be a computed value. In one or more embodiments, an input for the first principles model 108 that is a computed value is determined (e.g., computed) by the first principles model 108 and/or determined (e.g., computed) by a data-driven model 110.

Additionally or alternatively, one or more inputs for the first principles model 108 may include operational data (e.g., plant data) received from the industrial plant system 104. In some embodiments, operational data includes values (e.g., measurements) for one or more selected variables, where the one or more selected variables may include process variable(s). Non-limiting examples of selected variables may include temperature, feed flow, pressure, and/or the like. In some examples, one or more processes associated with the industrial plant system 104 may include sensor device(s) for measuring a portion of the input dataset (e.g., feed flow, temperature, pressure, and/or the like) for the first principles model 108.

In some embodiments, the data-driven model 110 is configured to perform one or more functionalities associated with correcting model prediction errors, for example, as a function of operating conditions. In some embodiments, a data-driven model describes a model that is generated based on empirical data. The empirical data may be obtained from historical data, simulations, experiments, a combination thereof, and/or the like. A data-driven model may be configured to extract and/or determine correlations and/or patterns in input dataset to generate corresponding output. In some embodiments, a data-driven model may include a machine learning model. In some embodiments, a machine learning model describes parameters, hyper-parameters, and/or defined operations of a rules-based algorithm and/or machine learning model (e.g., model including at least one or more rule-based layers, one or more layers that depend on trained parameters, coefficients, and/or the like).

In some embodiments, the data-driven model 110 may include one or more of any type of machine learning model including one or more supervised, unsupervised, semi-supervised, reinforcement learning models, and/or the like. In some examples, the data-driven model 110 may include multiple models configured to perform one or more different stages of a prediction process. In some embodiments, the data-driven model 110 includes a neural network, such as a recurrent neural network, deep neural network, and/or the like. In some examples, the data-driven model may include one or more neural networks that are previously trained, using one or more supervised and/or unsupervised machine learning techniques, to generate an error prediction for a first principles model, such as first principles model 108. In some embodiments, the data-driven model 110 includes a regression model, such as a linear regression model, a partial least square regression model, a support vector regression model, and/or the like. In some examples, the data-driven model may include one or more regression models that are previously trained, using one or more supervised and/or unsupervised machine learning techniques, to generate an error prediction for a first principles model, such as first principles model 108.

In some embodiments the data-driven model 110 is configured, trained, and/or the like to generate an error prediction for a first principles model 108. In some embodiments, an error prediction is a data entity that describes a measure of error, inaccuracy, and/or similar terms as user herein interchangeably associated with a model prediction, first principles model. In some embodiments, an error prediction is indicative of a difference between the output of the first principles model (e.g., FP model-predicted data) and corresponding ground-truth data. In some embodiments, an error prediction output of the data-driven model 110 may be indicative of a difference between predicted values for one or more process variables and corresponding ground-truth data (e.g., actual measurements) for the one or more process variables.

In some embodiments, the hybrid process simulation system 102 leverages the error prediction output of the data-driven model 110 to output optimal model-predicted data with improved prediction accuracy. To do so, in some embodiments, the hybrid process simulation system 102 applies the error prediction output of the data-driven models 110 to the FP model-predicted data output of the first principles model 108. In some embodiments, applying the error prediction output of the data-driven model 110 to the FP model-predicted data of the first principles model 108 includes aggregating the error prediction output of the data-driven model 110 with the FP model-predicted data of the first principles model 108. For example, in some embodiments, the error prediction output is added to the FP model-predicted data output of the first principles model.

In some embodiments, applying the error prediction output of the data-driven model to the FP model-predicted data output of the first principles model 108 includes providing the error prediction output of the data-driven model 110 as one or more parameters (e.g., input parameters) to the first-principles model 108. In some embodiments, a portion of the output of the data driven-model 110 may represent one or more input parameters to the first principles model 108 and/or may be leveraged to derive one or more input parameters to the first principles model 108. In some embodiments, the noted portion of the output of the data-driven model 110 may include an error prediction as described above and/or other data configured to facilitate correction of the prediction of the first principles model 108 or otherwise facilitate accurate prediction with respect to the first principles model.

In some embodiments, applying the error prediction output of the first principles model 108 includes replacing one or more input parameters to the first principles model with the error prediction output. For example, in some embodiments, a portion of the output of the data-driven model 110, which may include the error prediction, is provided as one or more input parameters to the first principles model 108 to replace corresponding one or more input parameters of the first principles model 108. In some embodiments, replacing an input parameter to the first principles model 108 includes replacing an initial value for an input parameter to the first principles model 108 with a portion of the output of the data-driven model 110.

In some embodiments, the first principles model 108 and/or the data-driven model 110 may represent a digital twin (e.g., digital twin model) of an industrial plant associated with the industrial plant system 104. In some embodiments, a digital twin model may describe a model-based representation of physical components (e.g., equipment, system, processes, etc.) in operation. The digital twin model may be configured to run with plant data in that incoming data from the plant is fed into the digital twin model to update the model. As described above, plant data (e.g., operational data) may include measurements of one or more measured process variables. As such, a digital twin model may describe at least in part a representation of equipment and/or processes of an industrial plant that reflects the current operating conditions, and may be used to monitor, refine, control, predict, and/or optimize operations of the industrial plant. Additionally or alternatively, the digital twin model may be used to collect and store various data associated with the operation of the industrial plant.

FIG. 2 illustrates a block diagram of an example apparatus that may be specially configured in accordance with an example embodiment of the present disclosure. Specifically, FIG. 2 depicts an example computing apparatus 200 ("apparatus 200") specially configured in accordance with at least some example embodiments of the present disclosure. In some embodiments, the intelligent process modeling and simulation system 102, and/or a portion thereof is embodied by one or more system(s), such as the apparatus 200 as depicted and described in FIG. 2. The apparatus 200 includes processor 202, memory 204, input/output circuitry 206, communications circuitry 208, FP model prediction circuitry 210, FP model prediction circuitry 210, error prediction circuitry 212, and process modeling simulation circuitry 214. In some embodiments, the apparatus 200 is configured, using one or more of the sets of circuitry 202-216 to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with the hybrid process simulation system 102. For example, in the one particular example embodiments, the processor 202 is configured to perform various operations associated with the first principles model 108 and/or the data-driven model 110. In some embodiments, the processor 202 includes hardware, software, firmware, and/or a combination thereof, for implementing one or more algorithms to model and/or simulate the execution of defined process(es) within the hybrid process simulation system 102, for example, based on inter-related asset models associated with the industrial plant system 104. For example, in some embodiments, the processor 202 includes hardware, software, firmware, and/or a combination thereof, for performing a variety of calculations associated with the first principles model 108 and/or the data-driven model 110. In some embodiments, the processor 202 can facilitate storing, sending and/or receiving data associated with the execution of the first principles model 108 and/or the data-driven model 110 among various components of the system 100.

In some embodiments, the apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from user device, one or more asset(s) or accompanying sensor(s), and/or other external computing device in communication with the apparatus 200.

The process simulation circuitry 214 includes hardware, software, firmware, and/or a combination thereof, that is configured to perform various functionalities associated with the hybrid process simulation system 102. In some embodiments, the process simulation circuitry 214 is configured to leverage a first principles model 108 to perform one or more of steady-state simulations and/or dynamic simulations. In some embodiments, the process simulation circuitry 214 includes hardware, software, firmware, and/or a combination thereof, that is configured to create and/or maintain flowsheet(s) (e.g., process definition document(s)) which simulate a general flow of plant processes of an industrial plant associated with the industrial plant system 104.

In some embodiments, the process simulation circuitry 214 includes hardware, software, firmware, and/or a combination thereof, that is configured to facilitate a model prediction correction scheme to generate optimal model-predicted data. In some embodiments, the model prediction correction scheme may be configured to correct model predictions (e.g., first principles model predictions) as a function of operation conditions. The model prediction correction scheme may be configured to account for non-linear behavior associated the process(es) modeled by the first principles model), such as non-linear behavior due to simulation of the execution of the define process(es) under different operating conditions. In some embodiments, to facilitate a model correction scheme configured to correct model predictions, such as predictions of first principles model 108, as a function of operation conditions, the process simulation circuitry 214 leverages a data-driven model, such as data-driven model 110.

In some embodiments, the process simulation circuitry 214 includes hardware, software, firmware, and/or a combination thereof, that is configured to provide input data (e.g., input dataset) that is leveraged by the first principles model 108 and the data-driven model 110 to generate their respective predictions. In some embodiments, the process simulation circuitry 214 includes hardware, software, firmware, and/or a combination thereof, that is configured to receive, store, and/or maintain the input data. In some embodiments, the process simulation circuitry 214 includes hardware, software, firmware, and/or a combination thereof, configured to receive the input data from one or more data sources, such as the industrial plant system 104 (e.g., client computing entity associated with the industrial plant system 104, storage subsystem 112). In some embodiments, the process modeling simulation circuitry 214 includes a separate processor, specially configured field programmable gate array (FPGA), or a specially programmed application specific integrated circuit (ASIC).

In some embodiments, the FP model prediction circuitry 210 includes hardware, software, firmware, and/or a combination thereof, configured to perform various functionalities associated with the hybrid process simulation system 102. In some embodiments, the FP model prediction circuitry 210 circuitry 212 includes hardware, software, firmware, and/or a combination thereof, that is configured to support configuration and/or generation of the first principles model 108. Additionally or alternatively, in some embodiments, the FP model prediction circuitry 210 includes hardware, software, firmware, and/or a combination thereof, that is configured to support fine-tuning, validating, and/or updating the first principles model 108.

In some embodiments, the FP model prediction circuitry 210 includes hardware, software, firmware, and/or a combination thereof, that is configured to leverage the first principles model 108 to model one or more processes associated with the industrial plant system 104 (e.g., one or more processes of an industrial plant associated with the industrial plant system 104). In some embodiments, the FP model prediction circuitry 210 includes hardware, software, firmware, and/or a combination thereof, configured to leverage the first principles model 108 to perform one or more calculations to simulate the execution of defined process(es) (e.g., process(es) of the industrial plant that is modeled using the first principles model 108). In some embodiments, the execution of the defined processes is simulated to generate FP model-predicted data. In some embodiments, a portion of the one or more calculations is performed within a flowsheet maintained by the hybrid process simulation system 102 and/or the first principles model 108. In some embodiments, the FP model prediction circuitry 210 is configured to leverage the first principles model 108 to perform one or more of steady-state simulation and/or dynamic simulation.

In some embodiments, the FP model prediction circuitry 210 includes hardware, software, firmware, and/or a combination thereof, that is configured to receive, store, and/or maintain input data (e.g., input dataset) leveraged by the first principles model 108 to simulate execution of defined process(es) and/or to generate FP model-predicted data. In some embodiments, the FP model prediction circuitry 210 receives at least a portion of the input data from the process simulation circuitry 214. In some embodiments, the input data includes plant data (e.g., operational data for the plant) associated with the defined process(es). The plant data, for example, may include measurements for one or more process variables associated with the defined process(es). For example, one or more processes of the industrial plant may include sensors configured for measuring process. Additionally or alternatively, in some embodiments, the input data may include simulated data. It would be appreciated that the input data may include other data, and may not be limited to plant data or simulated data. In some embodiments, the FP model prediction circuitry 210 includes hardware, software, firmware, and/or a combination thereof, that is configured to provide the input data to the first principles model 108 to facilitate simulating the execution of defined process(es) in order to generate FP model-predicted data. In some embodiments, the FP model prediction circuitry 210 includes hardware, software, firmware, and/or a combination thereof, that is configured to facilitate communication between the FP model prediction circuitry 210 and other components of the apparatus 200, such as the error prediction circuitry 212, process simulation circuitry 214, and/or the like. In some embodiments, the FP model prediction circuitry 210 includes a separate processor, specially configured field programmable gate array (FPGA), or a specially programmed application specific integrated circuit (ASIC).

In some embodiments, the error prediction circuitry 212 includes hardware, software, firmware, and/or a combination thereof, that is configured to performs various functionalities associated with the hybrid process simulation system 102. In some embodiments, the error prediction circuitry 212 includes hardware, software, firmware, and/or a combination thereof, that is configured to support configuration and/or generation of the data-driven model 110. Additionally or alternatively, in some embodiments, the error prediction circuitry 212 includes hardware, software, firmware, and/or a combination thereof, that is configured to support training, fine-tuning, validating, updating, and/or re-training the data-driven model 110.

In some embodiments, the error prediction circuitry 212 includes hardware, software, firmware, and/or a combination thereof, that is configured to facilitate communication between the error prediction circuitry 212 and other components of the apparatus 200, such as the FP model prediction circuitry 210, process simulation circuitry 214, and/or the like. In some embodiments, the error prediction circuitry 212 includes hardware, software, firmware, and/or a combination thereof, that is configured to implement one or more specially configured algorithms to generate one or more predictions. In some embodiments, the one or more predictions includes an error prediction that is indicative of the difference between the prediction of the first principles model 108 based on an input dataset and corresponding ground-truth values (e.g., actual plant measurements).

In some embodiments, the error prediction circuitry 212 includes hardware, software, firmware, and/or a combination thereof, that is configured to receive, store, and/or maintain input data (e.g., input dataset) leveraged by the data-driven model 110 to generate error prediction. In some embodiments, the input data is the same as the input data leveraged by the first principles model 108 to generate FP model-predicted data. In some embodiments, the input data includes plant data (e.g., operational data for the plant) associated with the defined process(es) (e.g., process(es) modeled by the first principles model 108). The plant data, for example, may include measurements for one or more process variables associated with the defined process(es). Additionally or alternatively, in some embodiments, the input data may include simulated data. It would be appreciated that the input data may include other data, and may not be limited to plant data or simulated data.

In some embodiments, the error prediction circuitry 212 is associated with a training phase and a prediction phase, wherein the data-driven model 110 is configured based at least in part on a training process and a prediction process. In some embodiments, the error prediction circuitry 212 includes hardware, software, firmware, and/or a combination thereof, that is configured to cause the data-driven model 110 to undergo a training process using a training dataset. The error prediction circuitry 212 may cause the data-driven model 110 to be trained to generate error predictions associated with a first principles model 108 by learning based on the training dataset. In some embodiments, the training the data-driven model 110 to generate error predictions associated with a first principles models 108 includes applying one or more machine learning techniques based on the training dataset.

In some embodiments, the error prediction circuitry 212 includes hardware, software, firmware, and/or a combination thereof, that is configured to provide the training dataset to the data-driven model 110. In some embodiments, the training dataset input to the data-driven model 110 may include one or more of historical input dataset, historical FP model-predicted data corresponding to the historical input dataset, historical ground-truth data (e.g., actual plant measurements) corresponding to the historical input dataset, and/or historical optimal model-predicted data corresponding to the historical input dataset.

In some embodiments, the error prediction circuitry 212 may cause the data-driven model to undergo a training process using the training dataset in order to identify features and/or to determine optimal coefficients. The optimal coefficients may represent adjustment or weights to apply with respect to the features in order to produce error prediction reflected in the training dataset, for example, based on positive and/or negative correlations between extracted features from historical input dataset, extracted features from historical FP model-predicted data corresponding to the historical input dataset, extracted features from historical ground-truth data (e.g., actual plant measurements) corresponding to the historical input dataset, extracted features from historical optimal model-predicted data corresponding to the historical input dataset, and/or extracted features from historical prediction error corresponding to the historical input dataset. As such, in some example, the weights for the data-driven model 110 may be generated during a training phase of the data-driven model 110. In some embodiments, the error prediction circuitry 212 includes a separate processor, specially configured field programmable gate array (FPGA), or a specially programmed application specific integrated circuit (ASIC).

In some embodiments, the optional control circuitry 216 includes hardware, software, firmware, and/or a combination thereof, that supports various functionality associated with causing configuration or causing other operation of at least one physical component (e.g., processing equipment, devices, systems, etc.) associated with the industrial plant system 104 (e.g., plant thereof). For example, in some embodiments, the optional control circuitry 216 includes hardware, software, firmware, and/or a combination thereof, that facilitates and/or causes automatic reconfiguration of the operation of at least one physical component based at least in part on the output of the hybrid process simulation system 102, the first principles model 108 and/or the data-driven model 110. In some embodiments, the optional control circuitry 216 includes a separate processor, specially configured field programmable gate array (FPGA), or a specially programmed application specific integrated circuit (ASIC).

Example Data Environments and Architectures of the Disclosure

Having described example systems and apparatuses of the disclosure, example data architectures, data environments, and data flows will now be described. In some embodiments, the data architectures represent data object(s) maintained and processed in particular computing environments. In some embodiments, the computing environment(s) is/are maintained via hardware, software, firmware, and/or a combination thereof, that execute one or more software application(s) that manage such data. For example, in some embodiments, the apparatus 200 executes one or more software application(s) that maintain the data architecture(s) as depicted and described to, perform the functionality as depicted and described with respect to process simulation and/or generation of optimal model-predicted data that accounts for variation in operating conditions.

FIGS. 3a and 3b each illustrate a visualization of an example data environment for correcting process model predictions in accordance with an example embodiment of the present disclosure in accordance with at least one embodiment of the present disclosure. Specifically, the data environment for generating the optimal process simulation output is performed by the hybrid process simulation system 102 using a hybrid process simulation model that includes a first principles model 108 and a data-driven model 110. In some embodiments, the hybrid process simulation system 102 is embodied by the apparatus 200 as depicted and described herein. In some embodiments, the hybrid process simulation system 102 causes rendering of, or otherwise provides access to, one or more user interfaces specially configured to enable inputting data.

In some embodiments, a first input dataset 302a is provided as input to the first principles model 108 and a second input dataset 302b is provided as input to the data-driven model 110. In some embodiments, the first input dataset 302a to the first principles model 108 is the same as the second input dataset 302b to the data-driven model 110. In some embodiments, the first input dataset 302a to the first principles model 108 is not the same as the second input dataset 302b to the data-driven model 110. In some embodiments, the second input dataset 302b to the data-driven model 110 is a subset of the first input dataset 302a to the first principles model 108. In some embodiments, the second input dataset 302b to the data-driven model may include data that is not included in the first input dataset 302a to the first principles model 108. In some embodiments, the second input dataset 302b to the data-driven model includes a portion (e.g., some, all) of the output from the first principles model 108. In some embodiments, the noted portion of the output from the first principles model 108 includes computed values corresponding to one or more input parameters to the data-driven model. For example, in some embodiments, the second input dataset 302b to the data-driven model 110 may include a subset of the first principles model 108 and/or a portion of the output of the first principles model. In some embodiments, at least a portion of the first input dataset 302a and/or at least a portion of the second input dataset 302b is received from the industrial plant system 104 (e.g., by process simulation circuitry 214). In some embodiments, at least a portion of the first input dataset 302a and/or at least a portion of the second input dataset 302b is received from a client computing entity associated with the industrial plant system 104.

In some embodiments, the first input dataset 302a includes one or more values for one or more process variables, such as measurements for the one or more process variables. In some embodiments, the one or more process variables corresponds to one or more parameters for the first principles model 108. For example, in some embodiments, the first principles model 108 includes one or more variable parameters, where at least a portion of the input dataset includes values for the one or more parameters. Additionally or alternatively, in some embodiments, the first principles model 108 includes one or more fixed parameters (e.g., one or more parameters having a fixed value). In some embodiments, the input dataset includes values for one or more variable parameters of the first principles model 108. In some embodiments, one or more variable parameters of the first principles model 108 is configured to be generated by the first principles model 108, for example, based at least in part on a portion of the input dataset. Additionally or alternatively, in some embodiments, one or more variable parameters of the first principles model 108 may be configured to be generated by a predictive model and provided to the first principles model 108. The predictive model, for example, may include a machine learning model that is trained to generate values for the one or more variable parameters based on the input dataset.

In some embodiments, upon receiving the first input dataset 302a, the first principles model 108 performs data transformation, processing, modeling, simulations, and/or the like based on the input data to generate FP model-predicted data 304. In some embodiments, the first principles model 108 executes one or more specially configured algorithms to generate the FP model-predicted data 304. In some embodiments, the FP model-predicted data 304 includes predicted values (e.g., measurements) for one or more process variables. In some embodiments, the one or more process variables may represent key performance indicators associated with the operation of an industrial plant whose process(es) is modeled by the first principles model 108.

In some embodiments, the FP model-predicted data 304 output of the first principles model 108 is stored in one or more data repository accessible to the hybrid process simulation system 102 and/or an end user, such that the FP model-predicted data 304 may be accessed, browsed, searched, and/or otherwise identified and selected for use. For example, FP model-predicted data 304 stored in the one or more data repository may be retrieved and used to train, fine-tune, re-train, validate, and/or update a data-driven model, such as data-driven model 110.

In some embodiments, the second input dataset 302b includes one or more values for one or more process variables, such as measurements for the one or more process variables. In some embodiments, the one or more process variables corresponds to one or more parameters for the data-driven model 110. For example, in some embodiments, the data-driven model includes one or more variable parameters, where at least a portion of the second input dataset 302b includes values for the one or more parameters. Additionally or alternatively, in some embodiments, the data-driven model 110 includes one or more fixed parameters (e.g., one or more parameters having a fixed value). In some embodiments, the second input dataset 302b includes values for one or more variable parameters of the data-driven model 110. In some embodiments, one or more variable parameters of the data-driven model 110 is configured to be generated by the first principles model 108. For example, in some embodiments, one or more variable parameters of the data-driven model 110 may be determined based on a portion of the output of the first principles model 108. For example, a portion of the output of the first principles model 108 may be leverage as a portion of the input to the data-driven model 110.

In some embodiments, upon receiving the second input dataset 302b, the data-driven model 110 performs data transformation, processing, modeling, simulations, and/or the like based on the second input dataset 302b to generate an error prediction 306 for the first principles model 108. In some embodiments, the first principles model 108 executes one or more specially configured algorithms to generate the error prediction 306. In some embodiments, the error prediction 306 is indicative of a discrepancy between FP model-predicted data 304 output of the first principles model 108 and corresponding ground-truth value(s). For example, the data-driven models 110 may be configured to generate error prediction 306 that includes inferred data indicative of the difference between the predicted values for the one or more process variables (e.g., key performance indicatives) and the corresponding ground-truth values (e.g., actual measurement for the one or more process variables).

In some embodiments, the error prediction 306 is generated as a function of operating conditions. For example, the data-driven model 110 may be trained to generate an error prediction for the first principles model 108 based at least in part on the operating condition. The data-driven model 110 may be trained to relate the operating condition and/or changes in operating condition to prediction error by the first principles model 108. The data-driven model may be trained under multiple scenarios, where each scenario is associated with unique set of operation conditions of a plurality of sets of operations conditions. As such, in some embodiments, the error prediction 306 may be indicative of a measure of mismatch (e.g., discrepancy) between the FP model-predicted data 304 and corresponding ground-truth values that results from executing the first principles model 108 under different operating conditions, such as new operating conditions not previously seen by the FP model-predicted data 304. In some embodiments, the data-driven model 110 is configured to generate error predictions 306 that accounts for non-linear behavior of the first principles model 108 resulting from simulating the execution of the process(es) of the industrial plant under different operating conditions.

In some embodiments, the data-driven model 110 may be configured to extract and/or determine correlations and/or patterns in the second input dataset 302b to generate an error prediction 306 for the first principles model 108. In some embodiments, a data-driven model may include a machine learning model. In some embodiments, a machine learning model describes parameters, hyper-parameters, and/or defined operations of a rules-based algorithm and/or machine learning model (e.g., model including at least one or more rule-based layers, one or more layers that depend on trained parameters, coefficients, and/or the like). In some embodiments, the data-driven model 110 may include one or more of any type of machine learning model including one or more supervised, unsupervised, semi-supervised, reinforcement learning models, and/or the like. In some examples, the data-driven model 110 may include multiple models configured to perform one or more different stages of a prediction process.

In some embodiments, the error prediction 306 output of the data-driven model 110 is stored in one or more repository accessible to the hybrid process simulation system 102 and/or an end user, such that the error prediction 306 may be accessed, browsed, searched, and/or otherwise identified and selected for use, such as re-training, fine-tuning, refining, and/or updating the data-driven model 110.

In some embodiments, the hybrid process simulation system 102 leverages the error prediction 306 output of the data-driven model 110 to generate optimal model-predicted data 308 indicative of optimal process simulation output. To do so, the hybrid process simulation system 102, in some embodiments, applies the error prediction 306 output of the data-driven models 110 to the FP model-predicted data 304 of the first principles model 108. In some embodiments and as shown in FIG. 3a, applying the error prediction 306 output of the data-driven model 110 to the FP model-predicted data 304 of the first principles model 108 includes aggregating the error prediction 306 with the FP model-predicted data 304 to generate optimal model-predicted data 308 that substantially matches corresponding ground-truth values. In some embodiments and as shown in FIG. 3b, applying the error prediction output of the data-driven model to the FP model-predicted data output of the first principles model 108 includes providing the error prediction output of the data-driven model 110 as one or more parameters (e.g., input parameters) to the first-principles model 108. In some embodiments, a portion of the output of the data driven-model 110 may represent one or more input parameters to the first principles model 108 and/or may be leveraged to derive one or more input parameters to the first principles model 108. In some embodiments, the noted portion of the output of the data-driven model 110 may include an error prediction as described above and/or other data configured to facilitate correction of the prediction of the first principles model 108 or otherwise facilitate accurate prediction with respect to the first principles model.

In some embodiments, applying the error prediction output of the first principles model 108 includes replacing one or more input parameters to the first principles model with the error prediction output. For example, in some embodiments, a portion of the output of the data-driven model 110, which may include the error prediction, is provided as one or more input parameters to the first principles model 108 to replace corresponding one or more input parameters of the first principles model 108. In some embodiments, replacing an input parameter to the first principles model 108 includes replacing an initial value for an input parameter to the first principles model 108 with a portion of the output of the data-driven model 110.

As such, by generating an error prediction for a first principles model, and applying the error prediction to the FP model-predicted data output of the first principles model, some embodiments of the present disclosure provide the capability to perform process simulation at different operating conditions not previously seen by the first principles model, and improve the accuracy of process simulation systems.

As described above, in some embodiments, the data-driven model 110 is previously trained using one or more training techniques. An operational example of training a data-driven model will now further be described with reference to FIG. 4.

FIG. 4 illustrates a visualization of an example data environment for training a data-driven model in accordance with at least one embodiment of the present disclosure. Specifically, the data environment for training the data-driven model may be performed by the hybrid process simulation system 102. In some embodiments, the hybrid process simulation system 102 is embodied by the apparatus 200 as depicted and described herein. In some embodiments, the hybrid process simulation system 102 causes rendering of, or otherwise provides access to, one or more user interfaces specially configured to enable inputting of particular data portions as depicted and described herein.

In some embodiments, the data-driven model 110 includes a neural network, such as a recurrent neural network, deep neural network, and/or the like. In some examples, the data-driven model may include one or more neural networks that are previously trained, using one or more supervised and/or unsupervised machine learning techniques, to generate an error prediction for a first principles model, such as first principles model 108. In some embodiments, the data-driven model 110 includes a regression model, such as a linear regression model, a partial least square regression model, a support vector regression model, and/or the like. In some examples, the data-driven model may include one or more regression models that are previously trained, using one or more supervised and/or unsupervised machine learning techniques, to generate an error prediction for a first principles model, such as first principles model 108.

FIG. 4 depicts an example training dataset 402. The training dataset 402 may be provided as input to the data-driven model 110 to train the data-driven model 110. In some embodiments, the training dataset 402 includes historical input datasets 406, historical FP model-predicted data 408 corresponding to the historical input dataset 406, ground-truth data 410 (e.g., actual plant measurement) corresponding to the historical input dataset 406, and/or other historical data corresponding to the historical input dataset 406. In some embodiments, the other historical data may include historical error predictions. In some embodiments, the hybrid process simulation system 102 may be configured to retrieve the historical FP model-predicted data 408, the historical input datasets 406, the ground-truth data 410, and/or other historical data from one or more repositories. In some embodiments, the one or more repositories include storage subsystem 112. In some embodiments, the hybrid process simulation system 102 may be configured to generate the training dataset 402 based on the historical input dataset 406 historical, historical FP model-predicted data 408, ground-truth data 410, and/or other data.

Upon receiving the training dataset 402, the data-driven model 110 undergoes training process. In some embodiments, the training process include extracting, determining, and/or learning correlations, relationships, and/or patterns in the training dataset 402, for example, as a function of operating conditions. In some embodiments, training the data-driven model, includes executing a plurality of simulation scenarios under difference operating conditions. For example, in some embodiments, each simulation scenario is associated with a set of one or more operating conditions of a plurality of sets of one or more operating conditions.

FIG. 5 illustrates a signal diagram of a model prediction correction scheme using a hybrid process simulation model in accordance with an example embodiment of the present disclosure. As described herein, in some embodiments, the error correction scheme includes correcting a first principles model prediction as a function of operating conditions. As depicted in FIG. 5, a first principles model 108 receives 502a a first input dataset and a data-driven model 110 receives 502b a second input dataset. In some embodiments, the second input dataset may include a subset of the first input dataset. In some embodiments, the first input dataset and the second input dataset may be the same.

In some embodiments, the first input dataset and the second input dataset are associated with the operation of an industrial plant (e.g., an industrial plant associated with the industrial plant system 104) whose process(es) is modeled and/or simulated by a hybrid process simulation system 102 (e.g., first principles model 108 thereof). In some embodiments, the first input dataset includes one or more values for one or more process variables associated with the process(es). For example, the first input dataset may include measurements for the one or more process variables associated with the process(es) modeled and/or simulated by the hybrid process simulation system 102 (e.g., first principles model 108 thereof). In some embodiments, the first input dataset is received from the industrial plant system 104.

In some embodiments, the second input dataset includes one or more values for one or more process variables associated with the process(es). For example, the second input dataset may include measurements for the one or more process variables associated with the process(es) modeled and/or simulated by the hybrid process simulation system 102 (e.g., first principles model 108 thereof).

In some embodiments, upon receiving the first input dataset, the first principles model 108 performs data transformation, processing, modeling, simulations, and/or the like based on the input dataset and/or other input data, to generate FP model-predicted data. In some embodiments, the other input data may be generated using a predictive model. In some embodiments, the other input data may include an output of the data-driven model 110. In some embodiments, a process simulation circuitry, such as process simulation circuitry 214, associated with the hybrid process simulation system 102 receives 504 the FP model-predicted data generated by the first principles model 108.

In some embodiments, upon receiving the second input dataset, the data-driven model 110 performs data transformation, processing, modeling, simulations, and/or the like based on the input dataset and/or other input data, to generate and an error prediction. In some embodiments, the other data may include an output of the first principles model. In some embodiments, the process simulation circuitry 214 receives 506 the error prediction generated by the data-driven model 110.

As depicted in FIG. 5, in some embodiments, the process simulation circuitry 214 applies the error prediction to the FP model-predicted data to generate optimal model-predicted data. In some embodiments, the optimal model-predicted data may be indicative of an optimized FP model-predicted data.

In some embodiments, the process simulation circuitry 214 stores 510 one or more of the input dataset, FP model-predicted data, error prediction, and/or optimal model-predicted data in a repository, such as storage subsystem 112.

As described above, in some embodiments, the hybrid process simulation system 102 is configured to facilitate a model prediction correction scheme for intelligently generating optimal model-predicted data (e.g., optimal process simulation output). An example of a model prediction correction scheme will now further be described with reference to FIG. 6.

FIG. 6 illustrates a flowchart including example operations of an example process for model prediction correction using a hybrid process simulation model that incorporates error correction as a function of operating conditions. Specifically, FIG. 6 illustrates an example computer-implemented process 600. In some embodiments, the process 600 is embodied by computer program code stored on a non-transitory computer-readable storage medium of a computer program product configured for execution to perform the process as depicted and described. Alternatively or additionally, in some embodiments, the process 600 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with separate physical component(s) of one or more industrial plants, and/or the like. For purposes of simplifying the description, the process 600 is described as performed by and from the perspective of the apparatus 200.

At block 602, the apparatus 200 includes FP model prediction circuitry 210, error prediction circuitry 212, process simulation circuitry 214, optional control circuitry 216, communications circuitry 208, input/output circuitry 206, processor 202, and/or the like, or a combination thereof, that receives, input dataset. In some embodiments, the input dataset is associated with the operation of an industrial plant. In some embodiments, the input dataset includes one or more values for one or more process variables associated with the operation of the industrial plant. For example, the input dataset may include measurements for the one or more process variables associated with process(es) modeled by the hybrid process simulation model. In some embodiments, the input dataset includes a first input dataset and a second input dataset. In some embodiments, the second input dataset is a subset of the first input dataset.

At block 604, the apparatus 200 includes FP model prediction circuitry 210, error prediction circuitry 212, process simulation circuitry 214, optional control circuitry 216, communications circuitry 208, input/output circuitry 206, processor 202, and/or the like, or a combination thereof, that generates, based on the input dataset and using a hybrid process simulation model, one or more predictions. In some embodiments, the hybrid process simulation model includes a first principles model configured to generate FP model-predicted data based on the input dataset, and a data-driven model configured to generate an error prediction for the first principles model based on the first input dataset. In some embodiments, the first input dataset is provided as input to each of the first principles model and second input dataset is provided to the data-driven model. In some embodiments, the input dataset includes one or more process variables that correspond to one or more parameters of the first principles model and/or one or more parameters of the data-driven model. For example, in some embodiments, the first principles model includes one or more variable parameters, where at least a portion of the input dataset includes values for the one or more parameters. For example, in some embodiments, the data-driven model includes one or more variable parameters, where at least a portion of the input dataset includes values for the one or more parameters.

In some embodiments, the FP model-predicted data output of the first principles model includes predicted value(s) for each of one or more process variables. In some embodiments, the one or more process variables includes one or more key performance indicators associated with the industrial plant (e.g., process(es) thereof). In some embodiments, the error prediction output of the data-driven model is indicative of a measure of discrepancy between the FP model-predicted data and ground-truth data for the one or more process variables.

At block 606, the apparatus 200 includes FP model prediction circuitry 210, error prediction circuitry 212, process simulation circuitry 214, optional control circuitry 216, communications circuitry 208, input/output circuitry 206, processor 202, and/or the like, or a combination thereof, that generates, based on the FP model-predicted data and the error prediction, optimal model-predicted data. The optimal model-predicted data may be indicative of optimal process simulation output that accounts for prediction errors with respect to the first principles model.

In some embodiments, generating the optimal model-predicted data includes applying the error prediction output to the FP model-predicted data output. In some embodiments, applying the error prediction output of the data-driven model 110 to the FP model-predicted data includes aggregating the error prediction output with the FP model-predicted data. For example, in some embodiments, the error prediction output is added to the FP model-predicted data output of the first principles model. In some embodiments, applying the error prediction output to the FP model-predicted data output includes providing the error prediction output of the data-driven model as one or more input parameters to the first-principles model. In some embodiments, applying the error prediction output of the first principles model includes replacing one or more input parameters to the first principles model with the error prediction output. In some embodiments, replacing an input parameter to the first principles model includes replacing an initial value for an input parameter to the first principles model with a portion of the output of the data-driven model.

At block 608, the apparatus 200 includes FP model prediction circuitry 210, error prediction circuitry 212, process simulation circuitry 214, optional control circuitry 216, communications circuitry 208, input/output circuitry 206, processor 202, and/or the like, or a combination thereof, that initiates based on the optimal model-predicted data, the performance of one or more prediction-based actions. In some embodiments, the one or more prediction-based actions comprise automatic reconfiguring of one or more process variables associated with operation of the plant based at least in part on the optimal model-predicted data. In some embodiments, the one or more prediction-based actions may comprise performing one or more offline studies (e.g., engineering studies), and/or optimization calculations. In some embodiments, the one or more prediction-based actions comprise rendering for display on a user interface, one or more of the FP model-predicted data, error prediction, and/or optimal model-predicted data.

CONCLUSION

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for generating optimal model prediction for process simulation, the computer-implemented method comprising:
   receiving input dataset associated with the operation of an industrial plant;
   generating, based on the input dataset and using a hybrid process simulation model, one or more predictions, wherein the one or more predictions comprise (i) First Principles (FP) model-predicted data generated by a first principles model, indicative of predicted value for each of one or more process variables and (ii) error prediction indicative of a discrepancy between the FP model-predicted data and ground-truth data for the one or more process variables;
   aggregating, the error prediction with the FP model-predicted data to generate one or more parameters as input to the first principles model;
   generating, based on the aggregation of the FP model-predicted data and the error prediction, optimal model-predicted data indicative of optimal process simulation output; and
   initiating, based on the optimal model-predicted data, the performance of one or more prediction-based actions.

2. The computer-implemented method of claim 1, wherein the hybrid process simulation model comprise (i) the first principles model configured to generate the FP model-predicted data, and (ii) a data-driven model configured to generate the error prediction.

3. The computer-implemented method of claim 2, wherein the data-driven model comprises a neural network model.

4. The computer-implemented method of claim 2, wherein the data-driven model comprises a regression model.

5. The computer-implemented method of claim 2, wherein the data-driven model is previously trained using one or more supervised training techniques.

6. The computer-implemented method of claim 2, wherein the data-driven model is trained on training dataset that includes one or more of historical input dataset, historical FP model-predicted data corresponding to the historical input dataset, or ground-truth data corresponding to the historical input dataset.

7. The computer-implemented method of claim 2, further comprising training the data-driven model, wherein (i) training the data-driven model comprises executing a plurality of simulation scenarios, and (ii) each simulation scenario is associated with a set of one or more operating conditions of a plurality of sets of one or more operating conditions.

8. The computer-implemented method of claim 2, wherein the input dataset is provided as input to (i) the first principles model and (ii) the data-driven model.

9. The computer-implemented method of claim 2, further comprising generating the hybrid process simulation model.

10. The computer-implemented method of claim 1, wherein generating the optimal model-predicted data comprises applying the error prediction to the FP model-predicted data.

11. The computer-implemented method of claim 1, wherein the hybrid process simulation model is configured for simulation at different operating conditions.

12. The computer-implemented method of claim 1, wherein the hybrid process simulation model is configured for online simulation and offline simulation.

13. The computer-implemented method of claim 1, wherein the one or more prediction-based actions comprise automatic reconfiguring of one or more process variables associated with operation of the industrial plant based on the optimal model-predicted data.

14. An apparatus comprising at least one processor and at least one non-transitory memory comprising program code stored thereon, wherein the at least one non-transitory memory and the program code are configured to, with the at least one processor, cause the apparatus to at least:

receive input dataset associated with the operation of an industrial plant;

generate based on the input dataset and using a hybrid process simulation model, one or more predictions, wherein the one or more predictions comprise (i) First Principles (FP) model-predicted data generated by a first principles model, indicative of predicted value for each of one or more process variables and (ii) error prediction indicative of a discrepancy between the FP model-predicted data and ground-truth data for the one or more process variables;

aggregating, the error prediction with the FP model-predicted data to generate one or more parameters as input to the first principles model;

generate, based on the aggregation of the FP model-predicted data and the error prediction, optimal model-predicted data indicative of optimal process simulation output; and initiate, based on the optimal model-predicted data, the performance of one or more prediction-based actions.

15. The apparatus of claim 14, wherein the hybrid process simulation model comprise (i) the first principles model configured to generate the FP model-predicted data, and (ii) a data-driven model configured to generate the error prediction.

16. The apparatus of claim 15, wherein the data-driven model comprises a neural network model.

17. The apparatus of claim 15, wherein the data-driven model comprises a regression model.

18. The apparatus of claim 15, wherein the data-driven model is previously trained using one or more supervised training techniques.

19. The apparatus of claim 15, wherein the data-driven model is trained on training dataset that includes one or more of historical input dataset, historical FP model-predicted data corresponding to the historical input dataset, or ground-truth data corresponding to the historical input dataset.

20. A computer program product comprising at least one non-transitory computer-readable storage medium having computer-readable program code portions stored therein, the computer-readable program code portions comprising an executable portion configured to:

receive input dataset associated with the operation of an industrial plant;

generate based on the input dataset and using a hybrid process simulation model, one or more predictions, wherein the one or more predictions comprise (i) First Principles (FP) model-predicted data generated by a first principles model, indicative of predicted value for each of one or more process variables and error prediction indicative of a discrepancy between the FP model-predicted data and ground-truth data for the one or more process variables;

aggregating, the error prediction with the FP model-predicted data to generate one or more parameters as input to the first principles model;

generate, based on the aggregation of the FP model-predicted data and the error prediction, optimal model-predicted data indicative of optimal process simulation output; and initiate, based on the optimal model-predicted data, the performance of one or more prediction-based actions.

\* \* \* \* \*